June 16, 1964

B. O. ZEINETZ 3,137,097

ROOF STRUCTURE

Filed April 14, 1960

9 Sheets-Sheet 1

INVENTOR

BERTIL OLOV ZEINETZ

BY [signature] ATTORNEY

INVENTOR
BERTIL OLOV ZEINETZ

BY [signature]
ATTORNEY

INVENTOR
BERTIL OLOV ZEINETZ

BY [signature]
ATTORNEY

INVENTOR
BERTIL OLOV ZEINETZ

BY [signature]
ATTORNEY

INVENTOR
BERTIL OLOV ZEINETZ

BY [signature]
ATTORNEY

June 16, 1964 | B. O. ZEINETZ | 3,137,097

ROOF STRUCTURE

Filed April 14, 1960 | 9 Sheets-Sheet 6

INVENTOR
BERTIL OLOV ZEINETZ

BY [signature]
ATTORNEY

June 16, 1964 B. O. ZEINETZ 3,137,097

ROOF STRUCTURE

Filed April 14, 1960 9 Sheets-Sheet 7

INVENTOR
BERTIL OLOV ZEINETZ

BY [signature] ATTORNEY

June 16, 1964

B. O. ZEINETZ 3,137,097

ROOF STRUCTURE

Filed April 14, 1960

9 Sheets-Sheet 8

INVENTOR
BERTIL OLOV ZEINETZ

BY [signature]
ATTORNEY

June 16, 1964 B. O. ZEINETZ 3,137,097

ROOF STRUCTURE

Filed April 14, 1960 9 Sheets-Sheet 9

INVENTOR
BERTIL OLOV ZEINETZ

BY A. Yatsalowski
ATTORNEY 3,137,097

ROOF STRUCTURE

Bertil Olov Zeinetz, 7 Storgatan, Stockholm, Sweden
Filed Apr. 14, 1960, Ser. No. 22,359
3 Claims. (Cl. 50—52)

This application is a continuation-in-part of my copending application Serial No. 562,344, filed January 30, 1956.

My invention relates to a roof structure.

More particularly my invention relates to a roof structure of the catenary type consisting of arches and tension or traction members stretched between said arches, said tension members in turn carrying the covering roof material.

In known embodiments of said type of catenary roof structures, represented, for example, by the large Arena built in Raleigh, N.C., U.S.A., and the Swiss Pavillon erected in 1952 on the Industrial Exposition in Berlin, Germany, the roof has two arches positioned opposite to one another with such inclination as to rise continuously from their ends towards their summit. The abutting ends of the arches thus constitute the lowest zone of the roof. Said arch ends are secured to the ground either directly or indirectly through two supports. Between said arches longitudinal tension or traction cables or wires are stretched in parallely spaced relation to one another at right angles to an imaginary straight line connecting the ends or supports. The lowest points of said cables are located at their middle zone. Said cables are crossed by transverse cables the ends of which are secured to the branch portions of the same arch and which rest on the longitudinal tension cables so as to have their middle zone located higher than their ends secured to the arch in consideration. In those cases where the ends of the arches are carried by supports, the two arches viewed in the horizontal projection describe a closed curve having a continuous bend in one and the same direction.

A load acting on the roof at any point thereof is absorbed by the longitudinal cables only and the tension produced therein tends to draw the summit zones of the arches nearer to one another. As a consequence the end zones of said arches tend to depart from one another and the horizontal forces produced thereby must be absorbed by the ground or the supports, respectively. The load causes a downwardly directed deflection of the roof at the acting place of the load resulting in a tension of the longitudinal cables and a slackening of the transverse cables. In order to avoid said result the arches must be constructed so as to be stiff laterally. Disposed between the ends of the arches are supports adapted to take up the vertical forces created by the weight of the arches and the load acting on the roof.

One main object of my invention is to provide a roof structure having a plurality of distinctive advantages over the catenary roof structures known in prior art.

A further object of my invention is to provide a roof structure adapted to transfer loads acting thereon to the carrying supports solely or at least to a substantial part in the form of vertical forces. This will result in a considerable simplification of the construction of the supports and as a consequence in an appreciable reduction of the manufacturing costs of the roof.

A still further object of my invention is to provide a roof which is adapted to be built with a large span while requiring a minimum of building material.

Further objects and advantages of my invention will be apparent from the following description considered in connection with the accompanying drawings which form part of the specification and of which:

Figure 1:
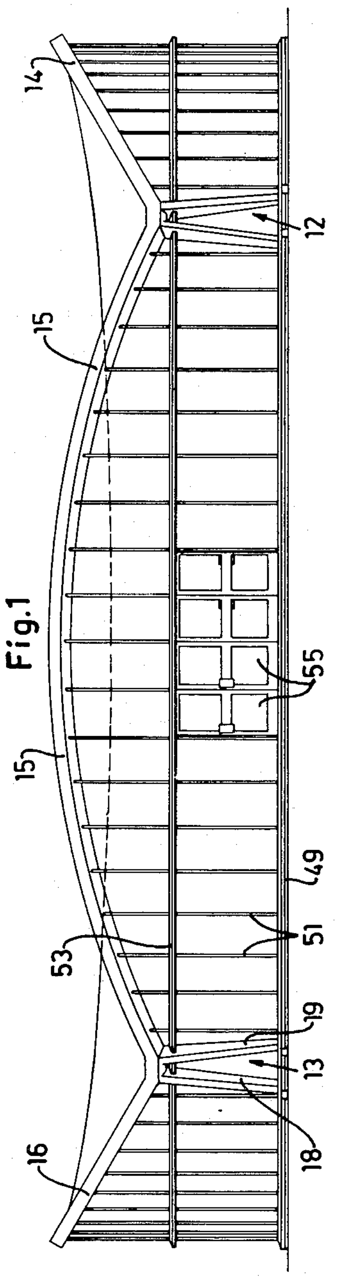
FIG. 1 is a lateral view of a building having a roof structure embodying my invention.
Figure 2:
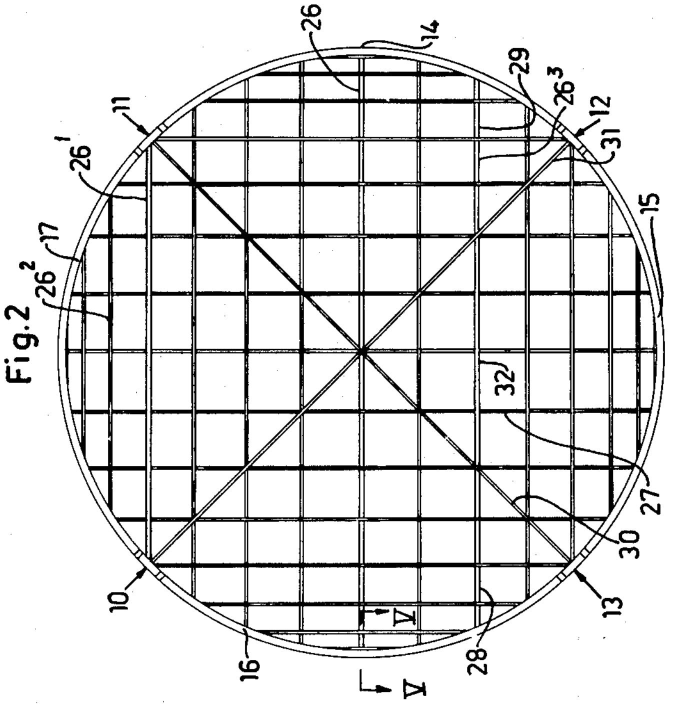
FIG. 2 is a top elevation of the roof structure shown in FIG. 1.

Referring to the drawings, the roof structure of the embodiment shown in FIGS. 1 to 16 is carried by four supports 10, 11, 12 and 13 equally spaced from one another. Said supports carry four arches 14, 15, 16 and 17 in pairs connected to said supports. Said arches have an inclined position so as to rise from their connection points with said supports in an outward and upward direction. In the embodiment in consideration said arches are further formed so as altogether, viewed in the plan, describe a circle as is easily understood from FIG. 2. In lateral projection each of said arches extends in one plane, as is shown in FIG. 1 with regard to the arches 14 ad 16. It is easily understood from the preceding description that the arches seen in their own plane have the form of an ellipse.

Figure 3:
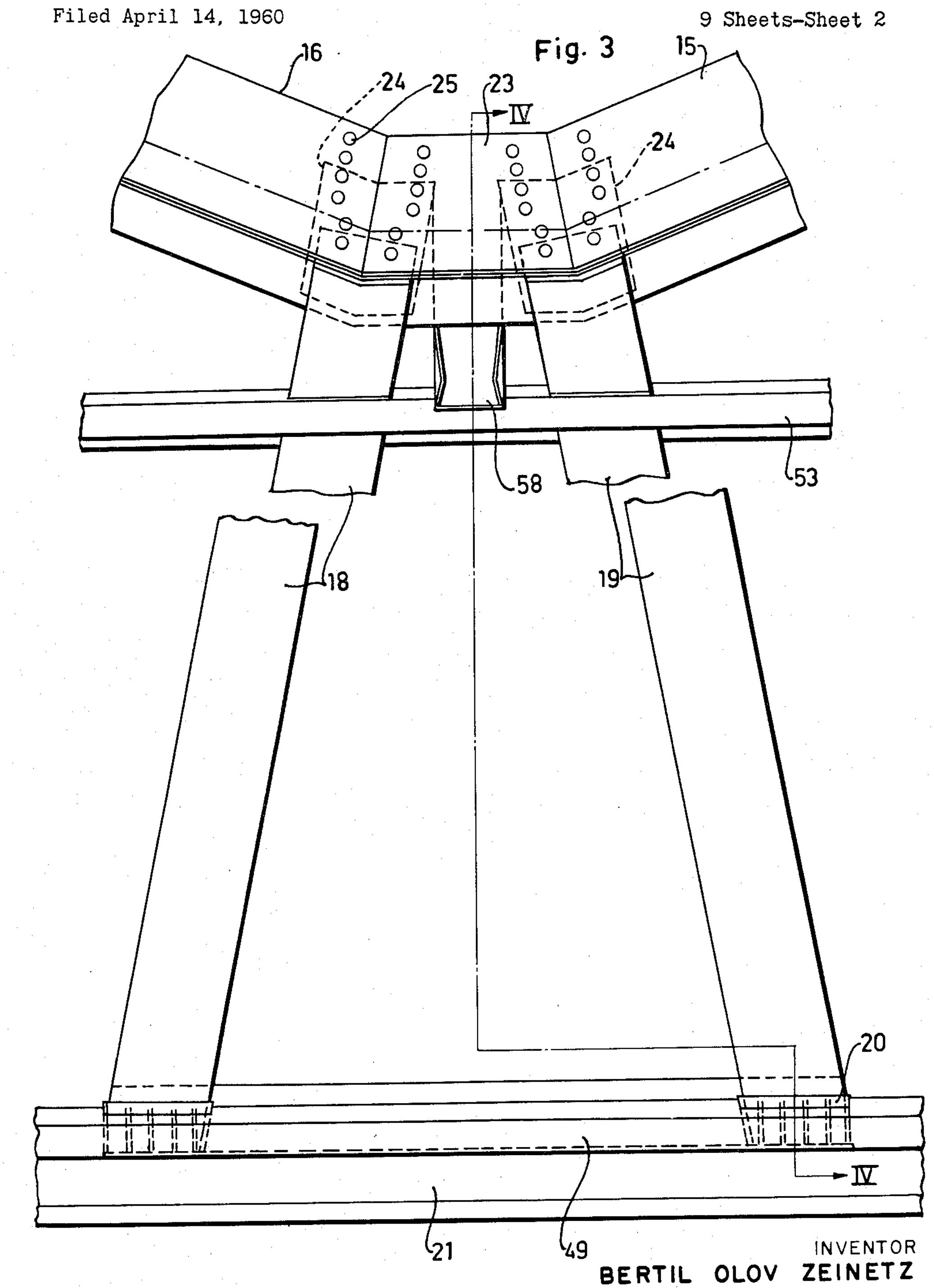
FIG. 3 is a lateral elevation in a larger scale than that used in FIGS. 1 and 2 of a support with parts of elements connected thereto.
Figure 4:
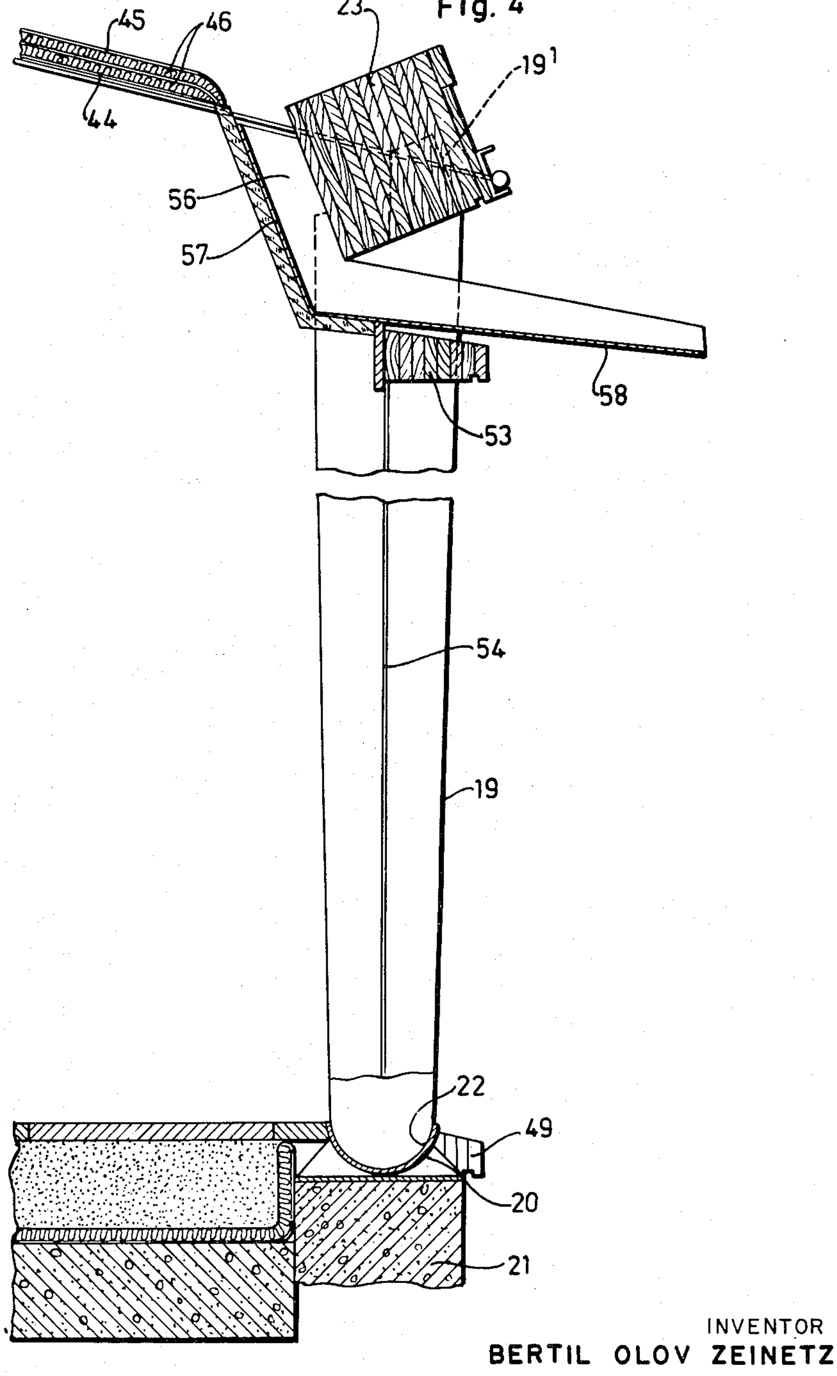
FIG. 4 is a section following the broken line IV—IV of FIG. 3.

The individual supports may be composed of two legs 18, 19 as is illustrated particularly in FIGS. 3 and 4, said legs being supported by bearing brackets which in turn are mounted on a circular concrete base 21 coinciding with the horizontal elevation plane of the arches. Each bearing bracket has a cylindrical bearing surface 22, the axis of which is a tangent to a circle following the concrete base 21, and which is intended to receive a correspondingly formed cylindrical surface of the leg. The supports are in this manner pivotable above the bearing surfaces 22 of the bearing brackets in planes extending in parallel to radii drawn from the centre of the building. The legs 18, 19 are at their upper ends joined with the ends of two adjacent arches. FIG. 3 illustrates the end parts of the arches 15 and 16, a joining member 23 being interposed between said end portions. The legs are connected with one arch end and the joining member 23 by means of plates 24 and boltings 25 so as to establish a firm connection. Besides, the legs have a projection 19[1]

engaging corresponding recesses or openings formed in the arch and the joining member, respectively.

Figure 5:
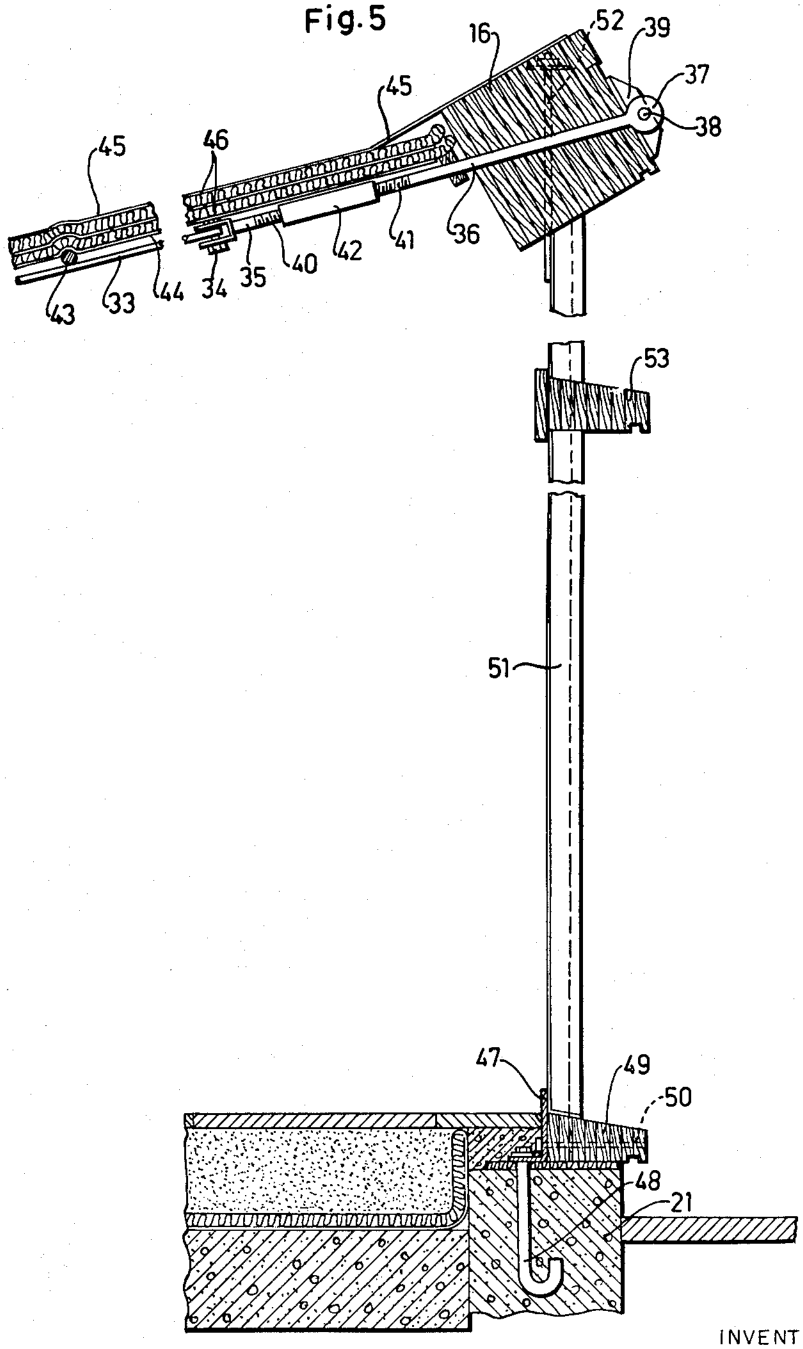
FIG. 5 is a sectional view in a larger scale following line V—V of FIG. 2.
Figure 6:
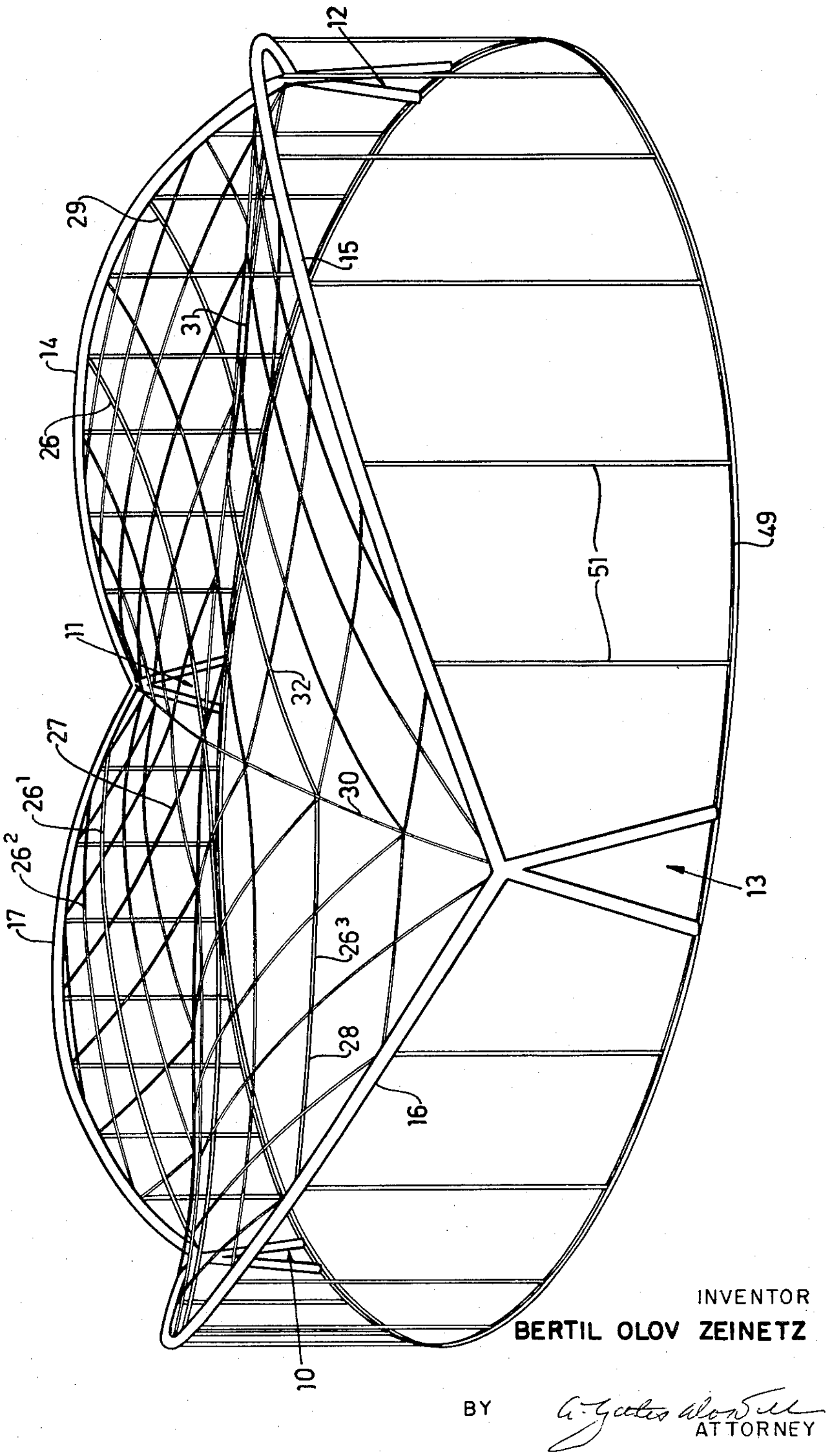
FIG. 6 is a perspective view of the building.

In the embodiments shown in FIGS. 1 to 16 the arches as well as the joining members are made of laminated layers of wood as will be understood from FIGS. 4 and 5. The legs 18, 19 may be made of the same material. Both the arches and the supports may be made of some other material as reinforced concrete, metal or other suitable material.

Stretched between the arches is a network composed of cable or wire members. In mutually parallel relationship spaced cables which hereinafter will be given the denomination 26 either without or with a suffix are positioned partly between the opposite arches 14 and 16 and partly between two points of the same arch 15 or 17, respectively. Thus the cable $26^1$ connects the two end parts of the arch 17 adjacent the supports 10 and 11 and the cable $26^2$ connects two points of the same arch which are located in spaced relation of and on a higher level than the end parts of said arch. The cables 26 are in the embodiment of the FIGS. 1 to 16 crossed at right angles by another group of cables which also extend in mutually parallel spaced relationship and which are denominated by the reference numeral 27 and an additional suffix.

Due to the inclination of the arches the net stretched in the manner aforedescribed represents a surface the highest points of which are situated at the summit of the arches and the lowest points adjacent the supports. The central zone of the roof is located on a level therebetween, a continuous slope from the central zone of the roof and the highest points of the arches in a direction towards the supports being obtained thereby so as to secure a natural flow of water.

The individual cables are curved in relation to the vertical plane with the centre of their curvature positioned above or below the roof. Most of the cables have parts curved in both directions also. In this respect three types of cables may be distinguished which in FIGS. 2 and 6 for the sake of clarification are marked with thicker lines though they in reality are of the same shape as the other cables. One of said cables has been given the denomination 26 and extends from the top points of two opposite arches, while being curved over its entire length with the centre of its curvature positioned above the roof. The cables located laterally of and in parallel with said middle cable 26 and extending between the same opposite arches within the area limited by the supports have the form represented by the line $26^3$. This cable has as in particular is evident from FIG. 6 two parts of length 28, 29 extending from the one or the other arch respectively to a diagonal cable 30 and 31, respectively, and having the centre of its curvature positioned above the roof. The middle part 32 of said cable is curved in the opposite direction. The third group of cables is represented by the line $26^1$ which thus extends between two points on the same arch. This group of cables have the centre of their curvature positioned below the roof.

The various cables are disposed at the crossing points so that a cable or a part of a cable which has the centre of its curvature positioned below the roof, or in other words is arching upwardly, and which also may be denominated supported cable or supported cable part is located above the crossing cable or cable part which always has the centre of its curvature positioned above the roof, or in other words is looping downwardly, and which may be denominated as load sustaining cable or load sustaining cable part. The cables need not be rigidly secured to one another or joined together by means of separate members.

FIG. 5 shows how a cable 33 is fixed in an arch. The cable has a loop or eye passed by a bolt 34 secured to a staying member 35. Another staying member extends through the arch 16 and has beyond said arch a loop or eye 37 within which is disposed a bolt 38 located in a support 39 contacting against and secured onto said arch.

The two stay wires or braces have facing end portions 40, 41 provided with threads turning at opposite directions and adapted to co-operate with a sleeve 42 having corresponding interior threads. By rotating the sleeves 42 the cable 33 is stretched. A cable 43 crossing the cable 33 is also shown in FIG. 5.

The network carries a roof cover which in the embodiment illustrated comprises a lower layer 44 and an upper layer 45 of a water-tight material such as fabric impregnated with a synthetic resin or plastic material. Interposed between said two layers are two mats 46 of some insulating material such as mineral wool. An angle plate 47 (FIG. 5) is anchored in the concrete base 21 by means of reinforcing irons 48. A socket 49 is in turn rigidly secured to the angle plate 47 by means of boltings 50. Anchored into this floor structure are staying members 51 extending upwardly to the arches and secured thereto by means of boltings 52. The staying members may be constituted by T-irons and they have for their purpose as regards structural strength to retain the arches against the action of the forces emanating from the cables, and tending to turn the arches upwardly about the fulcrums of the latter. Since the staying members are exposed to tensile stresses only they are allowed to have small cross section. They have also for their purpose, as is in particular evident from FIG. 1, to subdivide the interspace between the socket 49 and the arches into fields, suitably in co-operation with a horizontally extending wall girder 53. The fields thus formed over the cylindrical lateral face of the building are closed by panes of glass. One glass pane 54 is illustrated in FIG. 4. Other fields may house doors 55 mounted therein in the manner diagrammatically shown in FIG. 1. To drain off rain water, each support is formed with a drain channel 56 (FIG. 4) located between the joining member 23 and a wall 57 constituting a prolongation of the roof. Said channel is in connection with a gutter 58.

Figure 7:
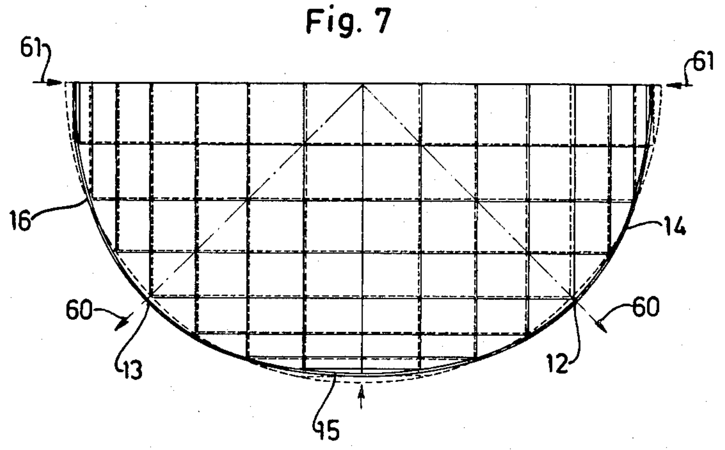
FIGS. 7 to 9 are diagrammatic top and lateral views, respectively, of arches, supports and cables of the building to make clear their movements or displacements relatively to one another under the action of an evenly distributed load acting downwards.
Figure 8:
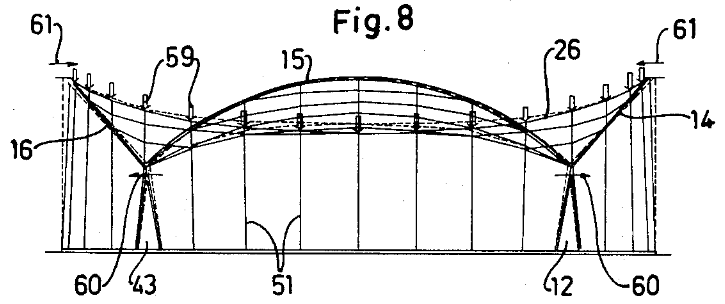
Figure 9:
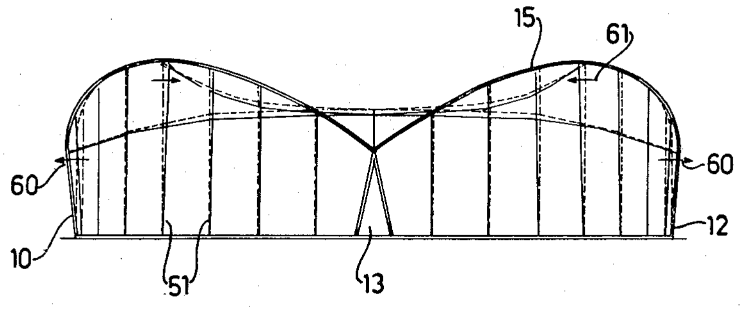

FIGS. 7 and 8 show the movements of or displacements within the entire building structure caused by an equally distributed and downwardly acting load indicated by arrows 59. The dash lines show the starting position of the structure parts and the full lines the changes of position of said parts under the action of the load in an excessive scale. The highest middle portions of the arches are tilted inwardly towards the centre as indicated by the arrows 61 and the cables are lowered as a result of the load, the greatest difference in level occurring with the centre part of the roof structure. Hereunder the stretching cables release the supports 10 to 13 which as a result tilt in an outward direction as is indicated by the arrows 60. The tilting movement in an outward direction of the ends of the arches caused in this connection results in that their top portions subjected to tractional load by the load sustaining cables are displaced in an inward direction and simultaneously increase the lowering of the load sustaining cables which lowering in turn has an effect on the stretching cables and so on. Due to the plurality of the arches a stretching of the whole cable network is brought about very soon so as in reality to keep the total displacements within very small limits. Said stretching is due to the feature that the cables in positions caused by increase of load totally require an increase of length which is offered by the yielding elongation of the cables. Thus the maximum yielding elongation of the cables and the compression of the arches together determine the magnitude of the movements or displacements. When the roof cables are lowered the ends of the arches follow the supports in their outwardly directed tilting movement indicated by the arrows 60.

Figure 10:
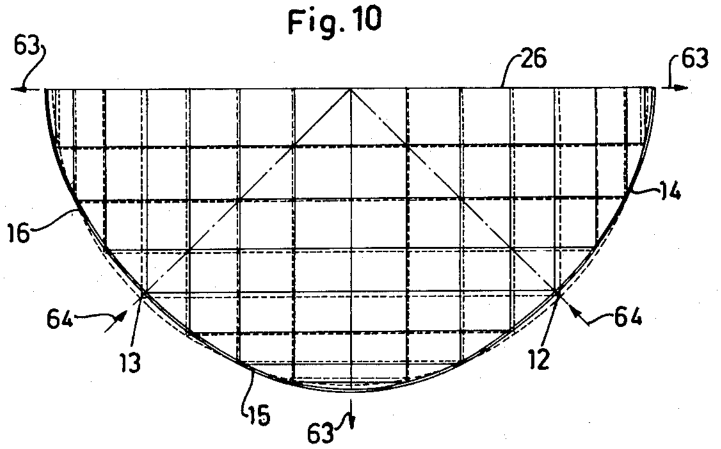
FIGS. 10 to 12 are corresponding views under the action of an evenly distributed load acting upwards.
Figure 11:
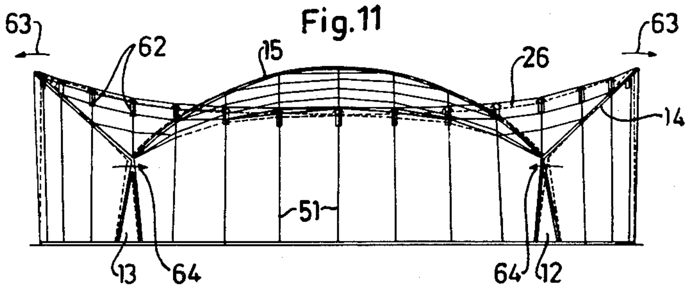
Figure 12:
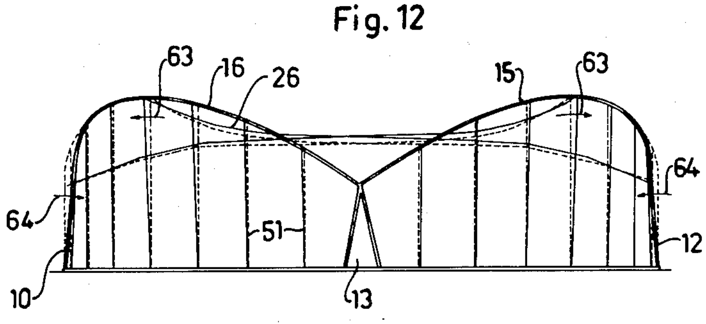

FIGS. 10 to 12 indicate the movements or displacements of the structure due to an upwardly directed and evenly distributed load indicated by the arrows 62. In this case also the full lines represent the position of the parts of the building upon application of the load. Such load may be constituted, for example, by the action of a blast of wind producing above the roof a vacuum when compared with the pressure prevailing within the building. This situation differs from that analysed hereinbefore by the feature that the top points of the arches are turned outwards as indicated by the arrows 63 while the end portions of the arches adjacent the supports move inwards as indicated by the arrows 64. The supports thus swing in this case inwards about their bearing faces 22. The maximum raising of the cable network occurs with the centre part of the building. As a result the peaks of the arches are released so as to cause them to perform an outwardly directed movement simultaneously with the stretching cables entraining the end portions of the arches in an inward direction. During the movement the cable network is initially relaxed until the outwardly acting load has balanced the own weight of said network. Thereupon due to the mechanical conditions produced by the plurality of the arches a stretching of the whole cable network is brought about until the load has been balanced. In the upward direction also the magnitude of the movements is determined by the yielding capacity of the cable network and the arches.

Figure 13:
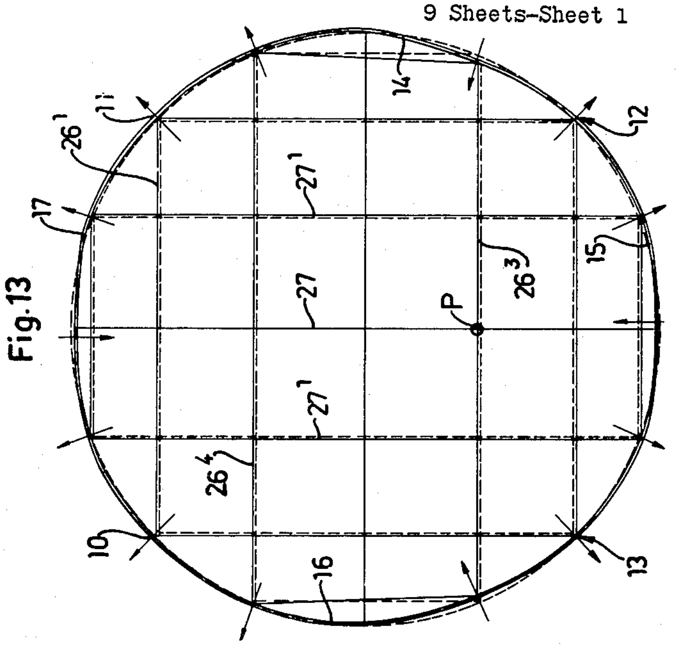
FIGS. 13 and 14 are diagrammatic top views of arches and cables and FIGS. 15 and 16 digrammatic lateral views of two cables under a load acting on one point of the roof.
Figure 14:
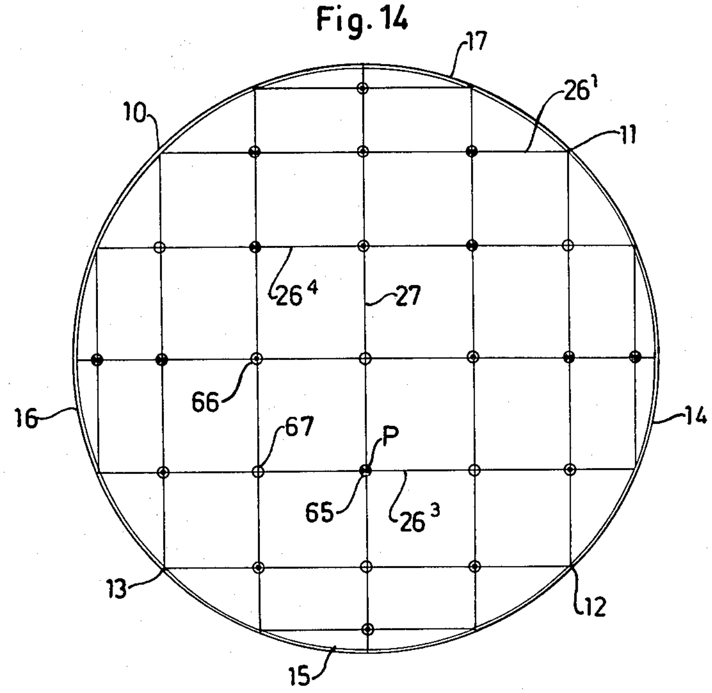
Figure 15:
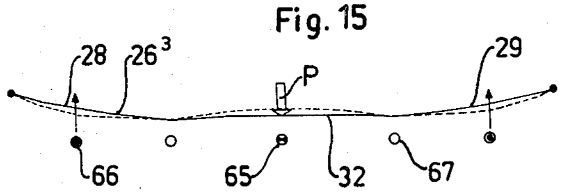
Figure 16:
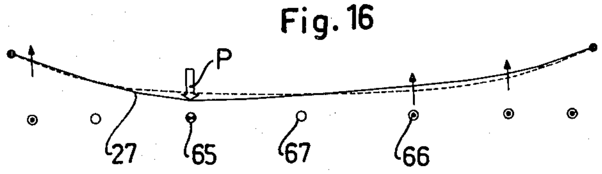

In FIGS. 13 to 16 a point load P is assumed to act on the roof in a downward direction. This action causes the horizontal movement in the structure which is illustrated in FIG. 13 partly by arrows and partly by dotted lines and full lines of which the first-mentioned lines indicate as before the initial position and the full lines the new position. FIGS. 14 to 16 illustrate the vertical movements in the structure, the numeral 65 marking a downwardly directed displacement at a point, where two lines cross one another, the numeral 66 an upwardly directed displacement at such crossing, and the numeral 67 an unchanged position of the crossing. As will be seen, the cable 26$^3$ passing through the point P is pressed downwards with its central stretching cable part 32, and is moved upwards with its load sustaining cable parts 28, 29. Simultaneously the form of the two arches 14 and 16 is changed so as to displace the line 26$^3$ inwardly towards the centre, as will be seen from FIG. 13. The arches 14 and 16 are thus bent inwardly at the securing point for the cable 26$^3$. Since the total length of the arch is constant another portion of the arches will be bent outwardly so as to cause a stretching of the cable 26$^4$, for example. The cable 27 is subjected to that change of form which is shown in FIG. 16 which means that it is also pressed downwards at the load attacking point P, but displaced upwards on both sides beyond the middle part of said cable. The stretching action to which the cable 27 is subjected will result in that the arches 15 and 17 are bent inwards with their middle portions towards one another, as is indicated in FIG. 13. Laterally of said middle portions the same arches are bent outwards so as to cause the cables 26$^1$ to be stretched and the spacing between them to be increased.

Also the cables disposed in laterally spaced parallel relation to said members are subjected to a similar stress though of a minor magnitude. This will result in a distribution of the tensile stresses produced by the load P in the tension members over the whole roof. Said tensile stresses are absorbed by the arches in the form of compressive forces transferred in the longitudinal direction of said arches downwardly to the supports 10, 11, 12 and 13. Due to the compensation of this tensile stressed between the tension members said compressive forces under the assumed conditions will become equally large in each of the ends of the arches abutting on one support, and the horizontal components of said forces will be compensated because they are opposed to one another. Each support will absorb the vertical component of said compressive forces. As the supports thus not at all or at the utmost slightly only will be acted upon by horizontal forces their structural shape and their mounting will become simpler and cheaper than in constructions hitherto known. It is easily understood that the horizontal forces at least to a substantial extent are absorbed within the roof.

The cables of the type denominated by 26$^1$ are intended to prevent the arches 14 to 17 from damage by buckling strains while at the same time lowering the members and crossing one another of the types denominated by 26 and 26$^2$, respectively, so as to bring them nearer to the plane of the arch. Due to the absence of supports absorbing compressive forces between the ends of the arch, each arch is adapted to oscillate around the hypothetical axis connecting the points where the arch is connected with the supports. The own weigth of the arch and a possible load within the segment encased by said arch may in this way be used to stretch the tension members. Depending on the angle of inclination of the arch relatively to the horizontal plane said vertical forces are in a position to keep the arch balanced in relation to the forces produced by the tension members actuated by a load acting on a part surface of the roof outside the arch in consideration and intending to turn the arch upwardly. In order to avoid such turning movement staying members 51 are provided as described more detailed hereinbefore.

Figure 17:
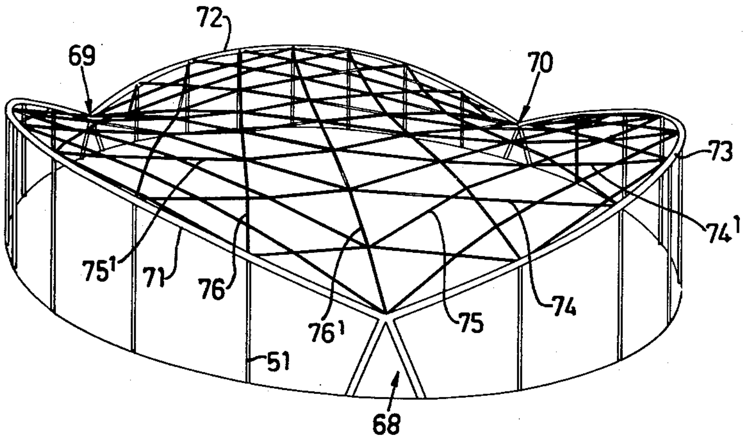
FIGS. 17 and 18 are perspective and top views, respectively, of a modified embodiment of the invention.
Figure 18:
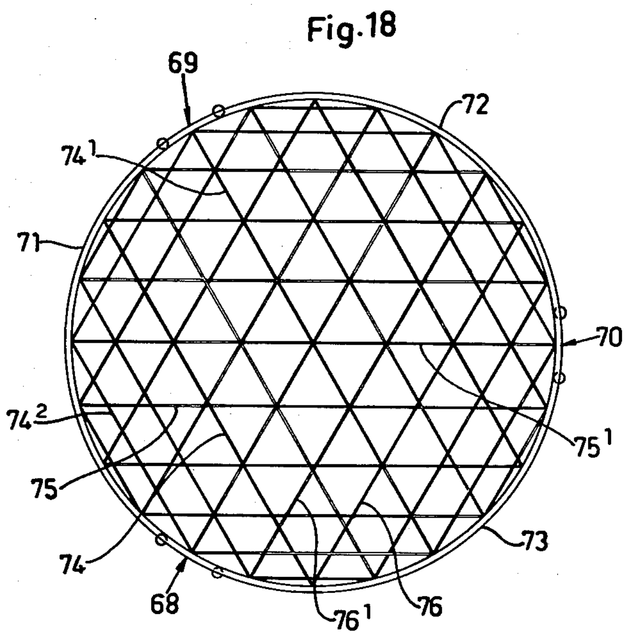

The embodiment illustrated in FIGS. 17 and 18 differs from the preceding embodiment substantially by the feature that the roof structure has three supports only generally denominated by reference numerals 68, 69 and 70. These supports may be built up in the same manner as in the preceding embodiment and carry three arches 71, 72 and 73. Between said arches three groups of mutually parallel cables 74, 75 and 76 extend. The cables 74 connect the arch 73 with the arches 71 and 72, the cables 75 the arch 71 with the arches 72 and 73 and the cables 76 the arch 72 with the arches 71 and 73. In each group one cable denominated by 74$^1$, 75$^1$ and 76$^1$, respectively, connects the peaks of the arches with the supports which in the same manner as in the preceding embodiment are located at the lowest points of the arches. Said cables are in this case all curved in both directions thus comprising a load sustaining cable part, the centre of curvature of which is looped downwardly and positioned above the roof, and a supported cable part, the centre of curvature of which is arched upwardly and positioned below the roof. The crossing angle between the various groups of cables is in this case not a right one but of a magnitude of 60°. In the same manner as in the preceding embodiment at the crossings a supporting cable part is always located above a load sustaining cable part. Moreover there are cables of the type indicated at 74$^2$ and contacting two points of one and the same arch. The operation of the cables is otherwise the same in this embodiment as that described with reference to the first embodiment.

In the horizontal plan the arches may together describe another contour than that of a circle, for example that of an ellipse.

While several embodiments of the invention have been shown and described it is to be understood that this is for purpose of illustration only and that the invention is not to be limited thereby, but its scope is to be determined by the appended claims.

What I claim is:

1. A roof structure comprising at least three supports, an arch extending from each support to an adjacent support, said arches projecting upwardly and outwardly from said supports and forming a closed curve in horizontal projection, a plurality of groups of cable means connecting said arches, one group of cable means being connected at one end to each of said arches, the opposite end of each group being connected to at least one other arch, the cable means of each group crossing at least one cable means of another group, certain of the cable means of each group arching upwardly throughout one portion of their length and being located above any cable means which they cross, said certain cable means being looped downwardly throughout another portion of their length and located below any cable means which they cross, whereby portions of certain of said cable means will support portions of other of said cable means and portions of said certain cable means will be supported by portions of said other cable means.

2. The structure of claim 1 in which said supports are pivotally mounted to permit tilting movement in a plane perpendicular to said closed curve.

3. The structure of claim 1 in which the curvature of said arches proceeds in the same direction.

References Cited in the file of this patent

UNITED STATES PATENTS

| | | |
|---|---|---|
| 2,093,836 | Guyon | Sept. 21, 1937 |
| 2,545,556 | Font | Mar. 20, 1951 |
| 2,705,928 | Pont | Apr. 12, 1955 |
| 2,928,360 | Heine | Mar. 15, 1960 |

FOREIGN PATENTS

| | | |
|---|---|---|
| 789,499 | France | Aug. 19, 1935 |
| 814,505 | France | Mar. 22, 1937 |

OTHER REFERENCES

Engineering News Record, Oct. 2, 1952, page 33.

Engineering News Record, Feb. 5, 1953, pp. 31–34 and 37.

American Concrete Institute Journal, Proceedings, January 1955, pp. 402–403.

Progressive Architecture, March 1955, pp. 130–131.